United States Patent [19]

Funaki et al.

[11] Patent Number: 5,753,354
[45] Date of Patent: May 19, 1998

[54] POLYSTYRENIC STRETCHED FILM, PROCESS FOR PRODUCING SAID FILM, PHOTOGRAPHIC FILM, PROCESS FILM FOR PRINTING, AND FILM FOR OVER-HEAD PROJECTORS

[75] Inventors: Keisuke Funaki; Takaaki Uchida; Masami Kogure, all of Ichihara, Japan

[73] Assignee: Idemitsu Petrochemical Co., Ltd., Tokyo, Japan

[21] Appl. No.: 682,567

[22] PCT Filed: Nov. 29, 1995

[86] PCT No.: PCT/JP95/02429

§ 371 Date: Jul. 29, 1996

§ 102(e) Date: Jul. 29, 1996

[87] PCT Pub. No.: WO96/17004

PCT Pub. Date: Jun. 6, 1996

[30] Foreign Application Priority Data

Dec. 2, 1994 [JP] Japan ..................... 6-299253

[51] Int. Cl.$^6$ ............... C08L 25/04; C08L 25/06; B29C 55/14
[52] U.S. Cl. ............... 428/220; 264/210.7; 264/235.8; 264/290.2; 428/521; 428/523; 428/910
[58] Field of Search ............... 264/210.7, 235.8, 264/290.2; 428/219, 220, 500, 521, 523, 910

[56] References Cited

U.S. PATENT DOCUMENTS 5,373,031 12/1994 Funaki et al. ..................... 522/3
5,518,817 5/1996 Yamasaki et al. ............... 428/411.1

FOREIGN PATENT DOCUMENTS 663166 5/1963 Canada .

OTHER PUBLICATIONS

Patent Abstracts of Japan, JP-A-6-87158, Mar. 29, 1994.
Patent Abstracts of Japan, JP-A-6-91748, Apr. 5, 1994.
Patent Abstracts of Japan, JP-A-6-91749, Apr. 5, 1994.

Primary Examiner—D. S. Nakarani
Attorney, Agent, or Firm—Oblon, Spivak, McClelland, Maier & Neustadt, P.C.

[57] ABSTRACT

There are disclosed a polystyrenic stretched film which comprises a styrenic resin composition containing 70 to 100% by weight of a styrenic polymer having a high degree of the syndiotactic configuration, and has a crystallinity of 35% or more, a dispersion of thickness of 8% or less, and a dispersion of birefringence in 1000 cm$^2$ of 20% or less, and a process for producing the polystyrenic stretched film. There are also disclosed a photographic film, a process film for printing, and a film for over-head projectors comprising the polystyrenic stretched film.

According to the present invention, a stretched film having excellent uniformity of thickness and showing little deformation such as warp, striation, and waviness after heating can be provided.

8 Claims, No Drawings

POLYSTYRENIC STRETCHED FILM, PROCESS FOR PRODUCING SAID FILM, PHOTOGRAPHIC FILM, PROCESS FILM FOR PRINTING, AND FILM FOR OVER-HEAD PROJECTORS

TECHNICAL FIELD

The present invention relates to a polystyrenic stretched film, a process for producing said film, a photographic film, a process film for printing, and a film for over-head projectors. More particularly, the present invention relates to a polystyrenic stretched film which is advantageously used as various types of base material for films, such as base materials for condenser films, pressure-sensitive adhesive films, electric insulation films, packaging films, and the like, a process for producing said film, a photographic film, a process film for printing, and a film for over-head projectors.

BACKGROUND ART

Styrenic polymers having the syndiotactic configuration have excellent mechanical properties, heat resistance, appearance, solvent resistance, and electric properties, and are expected to be used in various applications. Therefore, various technologies for extrusion of films, sheets, and fibers, various molded articles, and various applications have been proposed.

In the field of films, a material is frequently used for practical applications in the form of laminates of various materials. Therefore, it is necessary that a material exhibits little deformation or strain by heating during the operation of lamination. Stretched films having various physical properties which use the styrenic polymers having the syndiotactic configuration described above as a material, processes for producing stretched films, and various applications using the stretched films have been disclosed in Japanese Patent Application Laid-Open No. 182348/1989, Japanese Patent Application Laid-Open No. 182346/1989, Japanese Patent Application Laid-Open No. 67328/1990, Japanese Patent Application Laid-Open No. 143851/1990, Japanese Patent Application Laid-Open No. 74437/1991, Japanese Patent Application Laid-Open No. 86707/1991, Japanese Patent Application Laid-Open No. 124750/1991, Japanese Patent Application Laid-Open No. 131843/1991, Japanese Patent Application Laid-Open No. 261485/1992, Japanese Patent Application Laid-Open No. 200858/1993, Japanese Patent Application Laid-Open No. 57013/1994, Japanese Patent Application Laid-Open No. 57014/1994, Japanese Patent Application Laid-Open No. 57015/1994, Japanese Patent Application Laid-Open No. 57016/1994, Japanese Patent Application Laid-Open No. 57017/1994, Japanese Patent Application Laid-Open No. 64036/1994, Japanese Patent Application Laid-Open No. 64037/1994, Japanese Patent Application Laid-Open No. 65399/1994, Japanese Patent Application Laid-Open No. 65400/1994, Japanese Patent Application Laid-Open No. 65401/1994, Japanese Patent Application Laid-Open No. 65402/1994, Japanese Patent Application Laid-Open No. 80793/1994, Japanese Patent Application Laid-Open No. 91748/1994, Japanese Patent Application Laid-Open No. 91749/1994, Japanese Patent Application Laid-Open No. 91750/1994, Japanese Patent Application Laid-Open No. 99485/1994, Japanese Patent Application Laid-Open No. 100711/1994, Japanese Patent Application Laid-Open No. 106616/1994, Japanese Patent Application Laid-Open No. 107812/1994, Japanese Patent Application Laid-Open No. 107813/1994, Japanese Patent Application Laid-Open No. 114924/1994, and Japanese Patent Application Laid-Open No. 114925/1994.

However, films of conventional styrenic polymers having the syndiotactic configuration sometimes show deformation such as warp, striation, waviness, and the like by heating the films even though the films have small degrees of heat shrinkage. In other words, the films do not have sufficient uniformity of thickness, and this causes problems when the films are used as various types of base material for films.

DISCLOSURE OF THE INVENTION

As the result of intensive studies made by the present inventors to solve the above problems, it has been found that the deformation by heating is formed by uneven distribution of the degree of heat shrinkage on the films, and the uneven distribution is more pronounced when the degree of heat shrinkage is large. It has also been found by the present inventors that the uneven distribution of the degree of heat shrinkage is related to uneven orientation (uneven distribution of orientation in the surface of a film), uneven thickness (uneven distribution of thickness in the surface of a film), uneven crystallinity, and variation of crystallinity.

The present invention was completed under the above circumstances. The present invention was completed also on the basis of the knowledge that a stretched film comprising a styrenic resin composition provides a uniform thickness and shows very little deformations such as warp, striation, waviness, and the like by heating the film when crystallinity, dispersion of thickness, dispersion of birefringence, dispersion of crystallinity, and degree of heat shrinkage of the film are kept within respective specific ranges. The present invention was completed also on the basis of the discovery that crystallinity and uniformity of orientation in the surface of the produced film can be improved when the conditions for the stretching are kept within specific ranges in the production of the stretched film.

Accordingly, the present invention provides a polystyrenic stretched film which comprises a styrenic resin composition containing 70 to 100% by weight of a styrenic polymer having a high degree of the syndiotactic configuration, and has a crystallinity of 35% or more, preferably 37% or more, a variation of thickness of 8% or less, preferably 6% or less, and a variation of birefringence in 1000 $cm^2$ of 20% or less, preferably 15% or less. The polystyrenic stretched film of the present invention preferably has a dispersion of crystallinity of 5% or less, a thickness of film of 70 to 250 μm, and a sum of a degree of heat shrinkage in the longitudinal direction and a degree of heat shrinkage in the transverse direction of 5 % or less, more preferably 4% or less, in 5 minutes at 200° C. It is particularly preferable that the styrenic polymer contains 80 to 100% by mol of a styrene repeating unit and 0 to 20% by mol of p-methylstyrene repeating unit.

The present invention also provides a process for preparing a polystyrenic stretched film described above which comprises melting and kneading a styrenic resin composition containing 70 to 100% by weight of a styrenic polymer having a high degree of the syndiotactic configuration, molding the resultant melted and kneaded composition to prepare a preliminary molded product, stretching the prepared preliminary molded product in the longitudinal direction at a temperature of 95° to 135° C. and in the transverse direction at a temperature of 100° to 180° C. to a stretching ratio by area of 8 or more, heat treating the stretched preliminary molded product at 150° to 250° C. while the width thereof is held unchanged, and heat treating the resultant heat treated product under a limited shrinkage at 200° to 260° C.

The present invention also provides a photographic film, a process film for printing, and a film for over-head projectors each comprising the polystyrenic stretched film described above.

THE MOST PREFERRED EMBODIMENT TO CARRY OUT THE INVENTION

The material used for the polystyrenic stretched film is described in the following.

In the present invention, the styrenic polymer which has a high degree of the syndiotactic configuration means that its stereochemical structure is of high degree of the syndiotactic configuration, i.e., the stereo-structures in which phenyl groups or substituted phenyl groups as side chains are located alternately at opposite directions relative to the main chain consisting of carbon-carbon bonds. The tacticity thereof is quantitatively determined by the nuclear magnetic resonance method ($^{13}$C-NMR method) using a carbon isotope. The tacticity as determined by the $^{13}$C-NMR method can be indicated in terms of proportions of structural units continuously connected to each other, i.e., a diad in which two structural units are connected to each other, a triad in which three structural units are connected to each other, and a pentad in which five structural units are connected to each other. The styrenic polymer having a high degree of the syndiotactic configuration used in the present invention means polystyrene, a poly(alkylstyrene), a poly(halogenated styrene), a poly(alkoxystyrene), a poly(vinylbenzoic acid ester), a hydrogenation product of a polymer described above, a mixture of polymers described above, or a copolymer containing the units of the above polymers as main components, having such a syndiotacticity that the proportion of racemic diad is at least 75%, preferably at least 85%, or the proportion of racemic pentad is at least 30%, preferably at least 50%. Examples of the poly(alkylstyrene) include poly(methylstyrene), poly(ethylstyrene), poly (propylstyrene), poly(butylstyrene), poly(phenylstyrene), poly(vinylnaphthalene), poly(vinylstyrene), poly (acenaphthylene), and the like. Examples of the poly (halogenated styrene) include poly(chlorostyrene), poly (bromostyrene), poly(fluorostyrene), and the like. Examples of the poly(alkoxystyrene) include poly(methoxystyrene), poly(ethoxystyrene), and the like. Particularly preferred styrenic polymers among the polymers described above are copolymers of styrene and p-methyl-styrene, polystyrene, poly(p-methylstyrene), poly(m-methyl-styrene), poly(p-tertiary-butylstyrene), poly(p-chloro-styrene), poly(m-chlorostyrene), and poly(p-fluorostyrene) (refer to Japanese Patent Application Laid-Open No. 187708/1987).

Examples of the comonomer used for the copolymer containing the units of the styrenic polymers as main components thereof include monomers for the styrenic polymers described above; olefin monomers, such as ethylene, propylene, butene, hexene, octene, and the like; diene monomers, such as butadiene, isoprene, and the like; cyclic diene monomers; and polar vinyl monomers, such as methyl methacrylate, maleic anhydride, acrylonitrile, and the like.

Styrenic polymers containing 80 to 100% by mol of the repeating unit of styrene and 0 to 20% by mol of the repeating unit of p-methylstyrene are particularly preferably used.

The molecular weight of the styrenic polymer is not particularly limited. The styrenic polymer having a weight-average molecular weight of 10,000 or more and 3,000,000 or less, more preferably 50,000 or more and 1,500,000 or less, is preferably used. When the weight-average molecular weight is less than 10,000, sufficient stretching cannot be achieved sometimes. The molecular weight distribution of the styrenic polymer is not particularly limited, and polymers having various molecular weight distribution can be used. It is preferred that the ratio of the weight-average molecular weight (Mw) to the number-average molecular weight (Mn) is 1.5 or more and 8 or less. The styrenic polymer having the syndiotactic configuration has the heat resistance remarkably superior to that of styrenic polymers having the conventional atactic configuration.

The styrenic polymer having a high degree of the syndiotactic configuration described above is contained in the polystyrenic stretched film of the present invention in an amount of 70 to 100% by weight, preferably 80 to 100% by weight.

To the styrenic polymer having a high degree of the syndiotactic configuration of the present invention, lubricants, other thermoplastic resins, antioxidants, inorganic fillers, rubbers, compatibilizing agents, colorants, crosslinking agents, crosslinking aids, nucleating agents, plasticizers, and the like, may be added to form a composition to the extent that the object of the present invention is not impaired thereby.

As the lubricant, for example, inorganic particles can be used. The inorganic particles include oxides, hydroxides, sulfides, nitrides, halides, carbonates, sulfates, acetates, phosphates, phosphites, salts of organic acids, silicates, titanates, and borates of elements of IA, IIA, IVA, VIA, VIIA, VIII, IB, IIB, IIIB, and IVB Groups, hydrates of these compounds, complex compounds based on these compounds, and natural mineral particles.

Specific examples of the inorganic particles include compounds of elements of IA Group, such as lithium fluoride, borax (a hydrate of sodium borate), and the like; compounds of elements of IIA Groups, such as magnesium carbonate, magnesium phosphate, magnesium oxide (magnesia), magnesium chloride, magnesium acetate, magnesium fluoride, magnesium titanate, magnesium silicate, a hydrate of magnesium silicate (talc), calcium carbonate, calcium phosphate, calcium phosphite, calcium sulfate (gypsum), calcium acetate, calcium terephthalate, calcium hydroxide, calcium silicate, calcium fluoride, calcium titanate, strontium titanate, barium carbonate, barium phosphate, barium sulfate, barium phosphite, and the like; compounds of elements of IVA Group, such as titanium dioxide (titania), titanium monooxide, titanium nitride, zirconium dioxide (zirconia), zirconium monooxide, and the like; compounds of elements of VIA Group, such as molybdenum dioxide, molybdenum trioxide, molybdenum sulfide, and the like; compounds of elements of VIIA Group, such as manganese chloride, manganese acetate, and the like; compounds of elements of VIII Group, such as cobalt chloride, cobalt acetate, and the like; compounds of elements of IB Group, such as copper (I) iodide, and the like; compounds of elements of IIB Group, such as zinc oxide, zinc acetate, and the like; compounds of elements of IIIB Group, such as aluminum oxide (alumina), aluminum hydroxide, aluminum fluoride, aluminosilicates (aluminum silicate, kaolin, and kaolinite), and the like; compounds of elements of IVB Group, such as silicon oxides (silica, silica gel), graphite, carbon, glass, and the like; and particles of natural minerals, such as carnallite, kernite, mica (phlogopite), pyrolusite, and the like.

The average diameter of the inorganic particles is not particularly limited, and is preferably 0.01 to 3 μm. The inorganic particles are contained in the molded product in an amount of 0.001 to 5% by weight, preferably 0.005 to 3% by weight. The inorganic particles are contained in the finished molded product, and the method of incorporating the inorganic particles into the molded product is not particularly limited. For example, a method in which the inorganic particles are added or formed by precipitation at a desired step during polymerization, or a method in which the inorganic particles are added at a desired step during melt extrusion, may be used.

As the other thermoplastic resins which may be added to the styrenic resin described above in the present invention, various types of thermoplastic resin may be used. Examples of the thermoplastic resin include styrenic resins having the atactic configuration, styrenic resins having the isotactic configuration, polyphenylene ethers, and the like. These resins described above are easily compatible with the styrenic polymer having the syndiotactic configuration described above, and is effective for controlling crystallization in the preparation of a preliminary molded product for stretching. Therefore, the stretching property can be improved, and the conditions of the stretching can be easily controlled. Thus, a film having excellent mechanical properties can be obtained. When a styrenic resin having the atactic configuration and/or the isotactic configuration are added to the styrenic polymer having a high degree of the syndiotactic configuration, it is preferred that the added resins comprise monomer units similar to those of the styrenic polymer having a high degree of the syndiotactic configuration. The content of the compatible resin component in the styrenic resin composition is 1 to 70% by weight, preferably 2 to 50% by weight. The content of the compatible resin component more than 70% by weight is not preferable because the advantageous properties of the styrenic polymer having the syndiotactic configuration, such as heat stability, are sometimes impaired.

As other types of resins which can be added to the styrenic resin used in the present invention and are not compatible with the styrenic resin, any types of resin other than the compatible resins described above, such as polyolefins like polyethylene, polypropylene, polybutene, polypentene, and the like, polyesters like polyethylene terephthalate, polybutylene terephthalate, polyethylene naphthalate, and the like, polyamides like nylon-6, nylon-6,6, and the like, polythioethers like polyphenylene sulfide and the like, polycarbonates, polyarylates, polysulfones, polyether ether ketones, polyether sulfones, polyimides, polymers of halogenated vinyl compounds like teflon and the like, acrylic polymers like polymethyl methacrylate and the like, polyvinylalcohol, and the like other resins, crosslinked resins containing the compatible resins described above, can be used. Because these resins are not compatible with the styrenic polymer having the syndiotactic configuration used in the present invention, these resins can be dispersed in the styrenic resin having the syndiotactic configuration in the form of islands when these resins are added in small amounts. Therefore, these resins are effective for providing suitable gloss after stretching and for improving lubricating property of the surface. The content of the incompatible resin component is preferably 2 to 50% by weight when the incompatible resin component is added in order to improve gloss, and 0.001 to 5% by weight when the incompatible resin component is added in order to control the surface properties. When the product is used at high temperatures, it is preferred that a relatively heat resistant incompatible resin is used.

As the antioxidant, an antioxidant containing phosphorus, a phenolic antioxidant, or an antioxidant containing sulfur can be used. Polystyrenic resin compositions having good heat stability can be obtained by using such antioxidants.

As the antioxidant containing phosphorus, various types of antioxidant including monophosphites and diphosphites can be used. Examples of the monophosphite include tris(2,4-di-t-butylphenyl) phosphite, tris(mono- and di-nonylphenyl) phosphites, and the like. As the diphosphite, phosphites represented by the general formula:

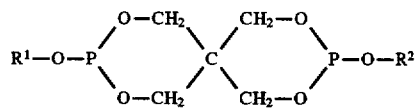

wherein $R^1$ and $R^2$ each represent an alkyl group having 1 to 20 carbon atoms, a cycloalkyl group having 3 to 20 carbon atoms, or an aryl group having 6 to 20 carbon atoms, and may the same or different, can be used. Specific examples of the diphosphite include distearylpentaerythritol diphosphite, dioctylpentaerythritol diphosphite, diphenylpentaerythritol diphosphite, bis(2,4-di-t-butylphenyl)pentaerythritol diphosphite, bis(2,6-di-t-butyl-4-methylphenyl) pentaerythritol diphosphite, diclyohexylpentaerythritol diphosphite, tris(2,4-di-t-butylphenyl) phosphite, tetrakis(2,4-di-t-butylphenyl)-4,4'-biphenylene phosphonite, and the like. Among these compounds, bis(2,4-di-t-butylphenyl) pentaerythritol diphosphite, bis(2,6-di-t-butyl-4-methylphenyl)pentaerythritol diphosphite, tris(2,4-di-t-butylphenyl) phosphite, and tetrakis(2,4-di-t-butylphenyl)-4,4'-biphenylene phosphonite are preferably used.

As the phenolic antioxidant, various types of phenolic antioxidant can be used. Specific examples of the phenolic antioxidant include dialkylphenols, trialkylphenols, diphenylmonoalkoxyphenols, tetraalkylphenols, and the like.

Examples of the dialkylphenol include 2,2'-methylene-bis (6-t-butyl-4-methylphenol), 1,1-bis(5-t-butyl-4-hydroxy-2-methylphenyl)butane, 2,2'-methylene-bis(4-methyl-6-cyclohexylphenol), 4,4'-thio-bis(6-t-butyl-3-methylphenol), 2,2'-bis(5-t-butyl-4-hydroxy-2-methylphenyl)-4-n-dodecylmercaptobutane, and the like. Examples of the trialkylphenol include 2,6-di-t-butyl-4-methylphenol, 2,2'-methylene-bis(6-t-butyl-4-ethylphenol), 2,2'-methylene-bis[4-methyl-6-(α-methylcyclohexyl)phenol], 2,2'-methylene-bis(4-methyl-6-nonylphenol), 1,1,3-tris(5-t-butyl-4-hydroxy-2-methylphenyl)butane, ethylene glycol-bis[3,3-bis(3-t-butyl-4-hydroxyphenyl)butyrate], 1,1-bis(3,5-dimethyl-2-hydroxyphenyl)- 3-(n-dodecylthio)butane, 1,3,5-tris(3,5-di-t-butyl-4-hydroxybenzyl)-2,4,6-trimethyl-benzene, 2,2-bis(3,5-di-t-butyl-4-hydroxybenzyl)malonic acid dioctadecyl ester, n-octadecyl-3-(4-hydroxy-3,5-di-t-butylphenyl) propionate, tetrakis[methylene(3,5-di-t-butyl-4-hydroxyhydrocinnamate)]methane, 3,9-bis[1,1-dimethyl-2-(β-(3-t-butyl-4-hydroxy-5-methylphenyl)propionyloxy) ethyl-2,4,8,10-tetraoxaspiro[5,5]undecane, tris(3,5-di-t-butyl-4-hydroxybenzyl) isocyanurate, and the like. Examples of the diphenylmonoalkoxyphenol include 2,6-diphenyl-4-methoxyphenol and the like. Examples of the tetraalkylphenol include tris(4-t-butyl-2,6-dimethyl-3-hydroxybenzyl) isocyanurate and the like.

As the antioxidant containing sulfur, thioether antioxidants are preferable. Specific examples of the thioether antioxidant include dilauryl-3,3'-thio-dipropionate, dimyristyl-3,3'-thiodipropionate, distearyl-3,3'-thiodipropionate, pentaerythritol-tetrakis(P-lauryl thiopropionate), bis[2-methyl-4-(3-n-alkylthiopropionyloxy)-5-t-butylphenyl] sulfides, 2-mercaptobenzimidazol, and the like. Among these compounds, pentaerythritol-tetrakis-(β-lauryl thiopropionate) is particularly preferable.

In the polystyrenic stretched film of the present invention, an organic compound having an —NH— group and a molecular weight lower than 10,000 may be contained when necessary. As the organic compound, a compound having an electron-attracting group adjacent to the —NH— group is preferable. As the electron-attracting group, a group having an aromatic ring, such as a benzene ring, a naphthalene ring, an anthracene ring, a pyridine ring, a triazine ring, an indenyl ring, or a derivative of these rings, or a group having a carbonyl group is preferable. As the organic compound described above, an organic compound having a heat decomposition temperature of 260° C. or higher is preferable. Specific examples of the organic compound include 2,4-bis-(n-octylthio)-6-(4-hydroxy-3,5-di-t-butylanilino)-1, 3,5-triazine, N,N'-hexamethylene-bis(3,5-di-t-butyl-4-hydroxyhydrocinnamide), N,N'-bis[3-(3,5-di-t-butylhydroxyphenyl)propionyl]hydrazine, 3-(N-salicyloyl)-amino-1,2,4-triazole, decamethylenedicarboxylic acid disalicyloyl hydrazide, isophthalic acid (2-phenoxypropionyl hydrazide), 2,2-oxamido-bis[ethyl-3-(3,5-di-t-butyl-4-hydroxyphenyl) propionate], oxalyl-bis (benzylidene hydrazide), N-formyl-N'-salicyloylhydrazine, 2-mercaptobenzimidazole, N,N'-di-2-naphthyl-p-phenylenediamine, 4,4'-bis(α,α-dimethylbenzyl) diphenylamine, 2-mercaptomethyl-benzimidazole, diphenylamine modified with styrene, diphenylamine modified with octyl group, N-phenyl-1-naphthylamine, poly(2,2,4-trimethyl-1,2-dihydroquinoline), 6-ethoxy-1,2-dihydro-2,2,4-trimethylquinoline, N,N'-diphenyl-p-phenylenediamine, N-phenyl-N'-(1,3-dimethyl-butyl)-p-phenylenediamine, N-phenyl-N'-(3-methacryloxy-2-hydroxylpropyl)-p-phenylenediamine, thiodiphenylamine, p-aminodiphenylamine, N-salicyloyl-N'-aldehyde hydrazine, N-salicyloyl-N'-acetylhydrazine, N,N'-diphenyloxamide, N,N'-di(2-hydroxyphenyl)oxamide, 6-ethoxy-2,2,4-trimethyl-1,2-dihydroquinoline, N-phenyl-N'-isopropyl-p-phenylene-diamine, and the like.

The compound having an —NH— group and a molecular weight lower than 10,000 described above is contained in the polystyrenic stretched film of the present invention in an amount less than 30% by weight when necessary.

The physical properties of the polystyrenic stretched film of the present invention are described in the following.

The polystyrenic stretched film of the present invention has a crystallinity (Xc) of 35% or more, preferably 37% or more. A crystallinity less than 35% is not preferable because the degree of heat shrinkage is increased to cause a larger deformation by heating. The polystyrenic stretched film of the present invention has a variation of thickness of 8% or less, preferably 6% or less, and a variation of birefringence (Δn) in 1000 cm$^2$ of 20% or less, preferably 15% or less. A variation of thickness more than 8% is not preferable, and a variation of birefringence in 1000 cm$^2$ more than 20% is not preferable either, because waviness is caused in the stretched film after heating in both cases.

It is preferred that the polystyrenic stretched film of the present invention has a variation of crystallinity (Xc) of 5% or less. A variation of crystallinity (Xc) more than 5% is not preferable because waviness is caused in the stretched film after heating. It is preferable that the polystyrenic stretched film of the present invention has a film thickness of 70 to 250 μm, and a sum of a degree of heat shrinkage in the longitudinal direction and a degree of heat shrinkage in the transverse direction of 5% or less, preferably 4% or less, in 5 minutes at 200° C. A sum of a degree of heat shrinkage in the longitudinal direction and a degree of heat shrinkage in the transverse direction of more than 5% after the heat treatment is not preferable because the degrees of shrinkage of the stretched film is increased to cause increase in deformation by heating.

The physical properties of a stretched film described above can be evaluated, for example, in accordance with the following methods and equations.

(1) Variation of birefringence (Δn): Birefringence is measured at lattice points placed at a distance of 10 cm to each other in an area of 1000 cm$^2$ by using a polarized microscope attached with OLYMPUS BEREK COMPENSATOR.

Variation (%)={(maximum Δn−minimum Δn)/average Δn}×100

(2) Variation of thickness: Thickness is measured at lattice points placed at a distance of 10 cm to each other in an area of 1000 cm$^2$ by using a thickness meter.

Variation of thickness (%)={(maximum thickness−minimum thickness)/average thickness}×100

(3) Crystallinity (Xc): Crystallinity (Xc) is measured with samples taken at lattice points placed at a distance of 10 cm to each other in an area of 1000 cm$^2$ by using a differential scanning calorimeter or the like apparatus.

Crystallinity (%)={(enthalpy of fusion (J/g)−enthalpy of crystallization by cooling (J/g))/53 (J/g)}×100

Variation of crystallinity (%)={(maximum Xc−minimum Xc)/average Xc}×100

As the enthalpy of fusion at the crystallinity of 100%, the value of 53 J/g is used for the styrenic polymer having the syndiotactic configuration.

(4) Degree of heat shrinkage: Test pieces of a width of 5 cm and a length of 30 cm are taken along the longitudinal direction and along the transverse direction. The test pieces are left standing in an oven of 200° C. for a specified time. After cooling, the degree of heat shrinkage is obtained from the change in dimension along the longitudinal direction of the test piece.

The polystyrenic stretched film of the present invention having the excellent physical properties described above exhibits excellent uniformity of thickness, and very little deformation, such as warp, striation, and waviness, after the stretched film is heated.

The process for producing the polystyrenic stretched film of the present invention is described in the following.

The polystyrenic stretched film of the present invention can be produced by various processes which have conventionally been used. However, in order to obtain a stretched film having excellent uniformity of thickness, it is preferred that the following process is used.

In the process for producing the polystyrenic stretched film of the present invention, a preliminary molded product for stretching is prepared by melting and kneading a styrenic resin composition containing 70 to 100% by weight of a styrenic polymer having a high degree of the syndiotactic configuration, and subsequently by molding the kneaded styrenic resin composition.

More specifically, the preliminary molded product (a film, a sheet, or a tube) is prepared generally by the extrusion molding using the styrenic polymer having a high degree of the syndiotactic configuration as the material. In the extrusion molding, the melted and kneaded material for molding described above is molded to form a specified shape by using an extruder. As the extruder, any of a single screw extruder and a twin screw extruder may be used. An extruder having or not having a vent may be used. Foreign substances mixed with the material can be removed by attaching a suitable mesh or a filter to the extruder. As the mesh or the filter, a mesh or a filter having any shape such as a plate shape or a cylindrical shape may be used. The conditions for the extrusion is not particularly limited, and can be suitably determined in accordance with the situation. It is preferred that the temperature is selected in the range which is higher than the melting point or the decomposition temperature of the material for molding by 50° C. or more, and that the shearing force is selected in the range of $5 \times 10^6$ dyne/cm$^2$ or less. A T-die or a circular die can be used as the die.

In the present invention, it is necessary that variation of thickness of the preliminary molded product for stretching be held small. The variation of thickness is preferably less than 10%, more preferably less than 5%. In order to decrease the variation of thickness of the preliminary molded product for stretching, a suitable die is selected in accordance with melt viscosity of the styrenic polymer described above as well as in accordance with dependency of the melt viscosity on shear rate and temperature. It is also preferred that retention time and temperature change in the extruder is decreased.

In the process for producing the polystyrenic stretched film of the present invention, the obtained preliminary molded product for stretching is solidified by cooling after being molded by the extruder. As the medium for the cooling, various media, such as a gas, a liquid, a metal roll, or the like, can be used. When a metal roll is used, it is effective for decreasing the variation of thickness and preventing the formation of waviness that a method using an air knife, an air chamber, a touch roll, an electrostatic pinning, or the like, is adopted.

The temperature of cooling for solidification is generally in the range which is from 0° C. to the temperature higher than the glass transition temperature of the preliminary molded product for stretching by 30° C., preferably in the range which is from the temperature lower than the glass transition temperature of the preliminary molded product for stretching by 70° C. to the glass transition temperature. The rate of cooling can be suitably selected in the range of 200° to 3° C./sec.

The preliminary molded product which has been solidified by cooling is biaxially stretched. In the stretching, the product may be stretched simultaneously in the longitudinal direction and in the transverse direction. It is preferred that the product is stretched continuously. A batchwise stretching, such as stretching using a table stretcher, is not preferable because it sometimes causes increase in variation of thickness and orientation.

The stretching ratio by area is 8 or more, preferably 9 or more. A stretching ratio by area less than 8 is not preferable because uniformity of the stretching is insufficient.

As the method of stretching, various types of method, such as a method using a tenter, a method of stretching between rolls, a method using bubbling utilizing a gas pressure, a method of rolling, and the like, may be used. A suitable method or a combination of suitable methods can be selected from these methods. The temperature of stretching in the longitudinal direction is in the range of 95° to 135° C., preferably 100° to 135° C. The temperature of stretching in the transverse direction is 100° to 180° C., preferably 100° to 150° C. A temperature of stretching in the longitudinal direction lower than 95° C. is not preferable, and a temperature of stretching in the transverse direction lower than 100° C. is not preferable either, because the stretching is difficult in both cases. A temperature of stretching in the longitudinal direction higher than 135° C. is not preferable, and a temperature of stretching in the transverse direction higher than 180° C. is not preferable either, because uniformity of the stretching is insufficient in both cases.

The rate of stretching is generally $1 \times 10$ to $1 \times 10^5$%/minute, preferably $1 \times 10^3$ to $1 \times 10^5$%/minute.

Furthermore, in the present invention, it is preferred that the temperature distribution in the preliminary molded product for stretching is kept uniform during the stretching. During the stretching, the preliminary molded product for stretching which is brought into contact with a heated roll or the like tends to have uneven distribution of temperature in the direction of thickness or in the direction of width. Therefore, it is effective for suppressing uneven temperature distribution of the molded product described above during stretching that a heating apparatus without contact, such as an infrared heating apparatus, is used.

In the process for producing a polystyrenic stretched film of the present invention, the stretched film obtained under the conditions described above is further treated by fixing with heat. The treatment of fixing with heat can be conducted according to conventional methods. The stretched film is treated by fixing with heat under a tense condition, a relaxed condition, or a condition of limited shrinkage. It is possible that the treatment of fixing with heat is conducted in two or more separate steps under different conditions. It is preferred that the stretched preliminary molded product is treated for fixing with heat at 150° to 250° C. while the width thereof is held unchanged, and the resultant treated product is heat treated under a limited shrinkage at 200° to 260° C. The treatment of fixing with heat may be conducted under an atmosphere of an inert gas, such as argon gas, nitrogen gas, or the like. In the present invention, it is also preferred that the end parts of the film which has been stretched and heat treated is trimmed at portions of a width of 20 cm or more from the ends of the film.

According to the process for producing a polystyrenic stretched film of the present invention, a polystyrenic stretched film having excellent uniformity of thickness after heating can be efficiently produced.

In the polystyrenic stretched film of the present invention described above, the uniformity of thickness is little impaired by exposure to heat during use, and the film can be advantageously applied to a photographic film, a process film for printing, a film for overhead projectors, and the like.

The present invention is described in more detail with reference to examples. However, the present invention is not limited by the examples.

REFERENCE EXAMPLE 1

A glass vessel of a 500 ml inner volume which had been purged with argon was charged with 17 g (71 mmol) of copper sulfate pentahydrate (CuSO$_4$·5H$_2$O), 200 ml of toluene, and 24 ml (250 mmol) of trimethylaluminum, and the resultant mixture was allowed to react at 40° C. for 8 hours. After the reaction was finished, solid parts were removed from the reaction product, and 6.7 g of a catalyst product was obtained. The catalyst product had the molecular weight of 610 which was measured by the freezing point depression.

Preparation Example 1

[Preparation of a styrenic polymer having the syndiotactic configuration]

A reactor of a 2 liter inner volume was charged with the catalyst product obtained in Reference Example 1 described above in such an amount that 7.5 mmol of aluminum atom was contained, 7.5 mmol of triisobutylaluminum, 0.038 mmol of pentamethylcyclopentadienyltitanium trimethoxide, 0.95 liter of purified styrene, and 0.05 liter of p-methylstyrene, and polymerization of the resultant mixture was allowed to proceed at 90° C. for 5 hours. After the reaction was finished, the catalyst components were decomposed by a methanol solution of sodium hydroxide. The resultant product was repeatedly washed with methanol and dried to obtain 466 g of a polymer.

The weight-average molecular weight of the obtained polymer was measured by the gel permeation chromatography using 1,2,4-trichlorobenzene as the solvent at 130° C., and was found to be 305,000. The ratio of the weight-average molecular weight to the number-average molecular weight was 2.67. It was confirmed by the measurement of the $^1$H-NMR that the content of p-methylstyrene in the obtained polymer was 7% by mol. It was also confirmed by the measurements of the melting point and the $^{13}$C-NMR that the obtained polymer was polystyrene having the syndiotactic configuration.

Preparation Example 2

[Preparation of a styrenic polymer having the syndiotactic configuration]

A reactor of a 2 liter inner volume was charged with the catalyst product obtained in Reference Example 1 described above in such an amount that 7.5 mmol of aluminum atom was contained, 7.5 mmol of triisobutylaluminum, 0.038 mmol of pentamethylcyclopentadienyltitanium trimethoxide, 0.97 liter of purified styrene, and 0.03 liter of p-methylstyrene, and polymerization of the resultant mixture was allowed to proceed at 90° C. for 5 hours. After the reaction was finished, the catalyst components were decomposed by a methanol solution of sodium hydroxide. The resultant product was repeatedly washed with methanol and dried to obtain 466 g of a polymer.

The weight-average molecular weight of the obtained polymer was measured by the gel permeation chromatography using 1,2,4-trichlorobenzene as the solvent at 130° C., and was found to be 318,000. The ratio of the weight-average molecular weight to the number-average molecular weight was 2.51. It was confirmed by the measurement of the $^1$H-NMR that the content of p-methylstyrene in the obtained polymer was 4% by mol. It was also confirmed by the measurements of the melting point and the $^{13}$C-NMR that the obtained polymer was polystyrene having the syndiotactic configuration.

Preparation Example 3

[Preparation of a styrenic polymer having the syndiotactic configuration]

A reactor of a 2 liter inner volume was charged with the catalyst product obtained in Reference Example 1 described above in such an amount that 7.5 mmol of aluminum atom was contained, 7.5 mmol of triisobutylaluminum, 0.038 mmol of pentamethylcyclopentadienyltitanium trimethoxide, 0.90 liter of purified styrene, and 0.10 liter of p-methylstyrene, and polymerization of the resultant mixture was allowed to proceed at 90° C. for 5 hours. After the reaction was finished, the catalyst components were decomposed by a methanol solution of sodium hydroxide. The resultant product was repeatedly washed with methanol and dried to obtain 466 g of a polymer.

The weight-average molecular weight of the obtained polymer was measured by the gel permeation chromatography using 1,2,4-trichlorobenzene as the solvent at 130° C., and was found to be 312,000. The ratio of the weight-average molecular weight to the number-average molecular weight was 2.73. It was confirmed by the measurement of the $^1$H-NMR that the content of p-methylstyrene in the obtained polymer was 12% by mol. It was also confirmed by the measurements of the melting point and the $^{13}$C-NMR that the obtained polymer was polystyrene having the syndiotactic configuration.

Example 1

The styrenic polymer having the syndiotactic configuration obtained in Preparation Example 1 was melt extruded at 300° C., and then formed into pellets. The obtained pelletized material was melt extruded by an extruder equipped with a melt filter of a filtration accuracy of 5 μm, and then brought into tight contact with a cooling roll of 50° C. by the electrostatic pinning method to prepare a preliminary molded sheet for stretching having a thickness of 1400 μm.

The obtained preliminary molded sheet for stretching was continuously stretched at 110° C. to the stretching ratio of 3.5 in the longitudinal direction. The part of stretching was heated by an infrared heater. Then, the longitudinally stretched sheet was stretched at 115° C. to the stretching ratio of 4.0 in the transverse direction. The stretched sheet was subsequently heat treated at 230° C. while the width of the sheet is held unchanged, and then heat treated at 240° C. under the limited shrinkage of 6%. The obtained sheet having the width of 90 cm was trimmed at the both ends each by the width of 30 cm at 100° C. to obtain a film having a thickness of 100 μm at the central part.

The physical properties of the obtained stretched film were evaluated in accordance with the following methods.

(1) Variation of birefringence (Δn): Birefringence was measured at lattice points placed at a distance of 10 cm to each other in an area of 1000 cm$^2$ by using a polarized microscope attached with a Bereck compensator.

Variation-(%)={(maximum Δn−minimum Δn)/average Δn}×100

(2) Variation of thickness: Thickness was measured at lattice points placed at a distance of 10 cm to each other in an area of 1000 cm$^2$ by using a thickness meter (a product of MAHR, Militron).

Variation of thickness (%)={(maximum thickness−minimum thickness)/average thickness}×100

(3) Crystallinity (%): Crystallinity is measured with samples taken at lattice points placed at a distance of 10 cm to each other in an area of 1000 cm$^2$ by using a differential scanning calorimeter or the like apparatus.

Crystallinity (%)={(enthalpy of fusion (J/g)−enthalpy of crystallization by cooling (J/g))/53 (J/g)}×100

Variation of crystallinity (%)={(maximum Xc−minimum Xc)/average Xc}×100

(4) Degree of heat shrinkage: Five test pieces of a width of 5 cm and a length of 30 cm were taken along the longitudinal direction and along the transverse direction. The test pieces were left standing in an oven of 200° C. for 5 minutes. After cooling, the degree of heat shrinkage was obtained from the change in dimension along the longitudinal direction of the test piece.

(5) Deformation by heat: A test piece of 30 cm×33 cm was left standing in an oven of 200° C. for 5 minutes. After the test piece was cooled, the height of warp of the film was measured, and the formation of striation and waviness of the film was evaluated by visual observation.

The results are shown in Table 1.

Example 2

The styrenic polymer obtained in Preparation Example 2 was melt extruded at 300° C., and then formed into pellets.

The obtained pelletized material was melt extruded by an extruder equipped with a melt filter of a filtration accuracy of 5 μm, and then brought into tight contact with a cooling roll of 50° C. by the electrostatic pinning method to prepare a preliminary molded sheet for stretching having a thickness of 800 μm.

The obtained preliminary molded sheet for stretching was continuously stretched at 110° C. to the stretching ratio of 3.0 in the longitudinal direction. The part of stretching was heated by an infrared heater. Then, the longitudinally stretched sheet was stretched at 115° C. to the stretching ratio of 3.5 in the transverse direction. The stretched sheet was subsequently heat treated at 235° C. while the width of the sheet is held unchanged, and then heat treated at 245° C. under the limited shrinkage of 4%.

The obtained sheet having the width of 90 cm was trimmed at the both ends each by the width of 30 cm at 100° C. to obtain a film having a thickness of 75 μm at the central part.

The physical properties of the obtained stretched film were measured in accordance with the same methods as those used in Example 1.

The results are shown in Table 1.

Example 3

The styrenic polymer obtained in Preparation Example 3 was melt extruded at 300° C., and then formed into pellets. The obtained pelletized material was melt extruded by an extruder equipped with a melt filter of a filtration accuracy of 5 μm, and then brought into tight contact with a cooling roll of 30° C. by the electrostatic pinning method to prepare a preliminary molded sheet for stretching having a thickness of 2300 μm.

The obtained preliminary molded sheet for stretching was continuously stretched at 115° C. to the stretching ratio of 3.5 in the longitudinal direction. The part of stretching was heated by an infrared heater. Then, the longitudinally stretched sheet was stretched at 125° C. to the stretching ratio of 4.0 in the transverse direction. The stretched sheet was subsequently heat treated at 225° C. while the width of the sheet is held unchanged, and then heat treated at 235° C. under the limited shrinkage of 4%. The obtained sheet having the width of 90 cm was trimmed at the both ends each by the width of 30 cm at 100° C. to obtain a film having a thickness of 175 μm at the central part.

The physical properties of the obtained stretched film were measured in accordance with the same methods as those used in Example 1.

The results are shown in Table 1.

Comparative Example 1

The styrenic polymer obtained in Preparation Example 1 was melt extruded at 300° C., and then formed into pellets. The obtained pelletized material was melt extruded by an extruder equipped with a melt filter of a filtration accuracy of 5 μm, and then brought into tight contact with a cooling roll of 50° C. by the electrostatic pinning method to prepare a preliminary molded sheet for stretching having a thickness of 700 μm.

The obtained preliminary molded sheet for stretching was continuously stretched at 110° C. to the stretching ratio of 2.5 in the longitudinal direction. The part of stretching was not heated by an infrared heater. Then, the longitudinally stretched sheet was stretched at 115° C. to the stretching ratio of 2.8 in the transverse direction.

The stretched sheet was subsequently heat treated at 230° C. while the width of the sheet is held unchanged. The obtained sheet having the width of 90 cm was trimmed at the both ends each by the width of 30 cm at 30° C. to obtain a film having a thickness of 100 μm at the central part.

The physical properties of the obtained stretched film were measured in accordance with the same methods as those used in Example 1.

The results are shown in Table 1.

Comparative Example 2

The styrenic polymer obtained in Preparation Example 1 was melt extruded at 300° C., and then formed into pellets. The obtained pelletized material was melt extruded by an extruder equipped with a melt filter of a filtration accuracy of 5 μm, and then brought into tight contact with a cooling roll of 50° C. by the electrostatic pinning method to prepare a preliminary molded sheet for stretching having a thickness of 1400 μm.

The obtained preliminary molded sheet for stretching was continuously stretched at 110° C. to the stretching ratio of 3.5 in the longitudinal direction. The part of stretching was not heated by an infrared heater. Then, the longitudinally stretched sheet was stretched at 115° C. to the stretching ratio of 4.0 in the transverse direction.

The stretched sheet was subsequently heat treated at 140° C. while the width of the sheet is held unchanged, and then heat treated at 180° C. under the limited shrinkage of 6%.

The obtained sheet having the width of 90 cm was trimmed at the both ends each by the width of 30 cm at 100° C. to obtain a film having a thickness of 100 μm at the central part.

The physical properties of the obtained stretched film were measured in accordance with the same methods as those used in Example 1.

The results are shown in Table 1.

TABLE 1

(Part 1)

|  | average thickness μm | variation of thickness % | average crystallinity % | variation of crystallinity % | variation of birefringence % |
|---|---|---|---|---|---|
| Example 1 | 100 | 6 | 43 | 2 | 12 |
| Example 2 | 75 | 7 | 45 | 3 | 9 |
| Example 3 | 175 | 5 | 42 | 2 | 15 |
| Comparative Example 1 | 100 | 6 | 42 | 4 | 40 |
| Comparative Example 2 | 100 | 6 | 33 | 7 | 25 |

(Part 2)

| | degree of heat shrinkage | | deformation after heating | | |
|---|---|---|---|---|---|
| | longitudinal direction % | transverse direction % | warp mm | waviness | striation |
| Example 1 | 3.3 | 0.5 | 1> | none | none |
| Example 2 | 2.7 | 0.2 | 1> | none | none |
| Example 3 | 4.3 | 0.4 | 1> | none | none |
| Comparative Example 1 | 5.6 | 7.8 | 3.5 | found | none |
| Comparative Example 2 | 11.5 | 23.7 | 5.5 | found | found |

INDUSTRIAL APPLICABILITY

As described in the above, the polystyrenic stretched film of the present invention has an excellent uniformity of thickness, and shows very little deformation, such as warp, striation, and waviness by heating. According to the process for producing the polystyrenic stretched film of the present invention, the polystyrenic stretched film having the excellent properties can be efficiently produced. The photographic film, the process film for printing, and the film for over-head projectors of the present invention does not show deformation, such as warp, striation, and waviness, during use, and can be advantageously used.

Therefore, the polystyrenic stretched film, the photographic film, the process film for printing, and the film for over-head projectors of the present invention are remarkably valuable in the industrial applications.

We claim:

1. A polystyrenic stretched film which comprises a styrenic resin composition containing 70 to 100% by weight of a styrenic polymer having a syndiotacticity such that the proportion of racemic diad is at least 75%, and has a crystallinity of 35% or more, a variation of thickness of 8% or less, and a variation of birefringence in 1000 cm$^2$ of 20% or less.

2. The polystyrenic stretched film according to claim 1 wherein the polystyrenic polymer contains 80 to 100% by mol of the repeating unit of styrene and 0 to 20% by mol of the repeating unit of p-methylstyrene.

3. The polystyrenic stretched film according to claim 2 wherein the polystyrenic stretched film has a thickness of 70 to 250 μm and a sum of a degree of heat shrinkage in the longitudinal direction and a degree of heat shrinkage in the transverse direction of 5% or less in 5 minutes at 200° C.

4. The polystyrenic stretched film according to claim 1 wherein the polystyrenic stretched film has a variation of crystallinity of 5% or less.

5. The polystyrenic stretched film according to claim 4 wherein the polystyrenic stretched film has a thickness of 70 to 250 μm and a sum of a degree of heat shrinkage in the longitudinal direction and a degree of heat shrinkage in the transverse direction of 5% or less in 5 minutes at 200° C.

6. The polystyrenic stretched film according to claim 1 wherein the polystyrenic stretched film has a thickness of 70 to 250 μm and a sum of a degree of heat shrinkage in the longitudinal direction and a degree of heat shrinkage in the transverse direction of 5% or less in 5 minutes at 200° C.

7. The polystyrenic stretched film according to claim 1, wherein the proportion of racemic diad is at least 85%.

8. A process for producing a polystyrenic stretched film described in claim 1 which comprises melting and kneading a styrenic resin composition containing 70 to 100% by weight of a styrenic polymer having a syndiotacticity such that the proportion of racemic diad is at least 70%, molding the resultant melted and kneaded composition to prepare a preliminary molded product, stretching the prepared preliminary molded product in the longitudinal direction at a temperature of 95° to 135° C. and in the transverse direction at a temperature of 100° to 180° C. to a stretching ratio by area of 8 or more, heat treating the stretched preliminary molded product at 150° to 250° C. while the width thereof is held unchanged, and heat treating the resultant heat treated product under a limited shrinkage of from 4% to 6% at 200° to 260° C.

* * * * *